United States Patent [19]

Ratcliff

[11] Patent Number: 4,858,227
[45] Date of Patent: Aug. 15, 1989

[54] SPACE AND TIME HAVING MULTIPLEXED MEMORIES

[75] Inventor: Reginald Ratcliff, Atlanta, Ga.

[73] Assignee: Solid State Systems, Inc., Kennesaw, Ga.

[21] Appl. No.: 72,059

[22] Filed: Aug. 25, 1987

[51] Int. Cl.$^4$ .................................................. H04Q 11/04
[52] U.S. Cl. ......................................... 370/59; 370/60; 370/110.1
[58] Field of Search .................. 370/58, 59, 60, 62, 370/64, 67, 14, 6, 94, 110.1

[56] References Cited

U.S. PATENT DOCUMENTS

| | | | |
|---|---|---|---|
| 4,287,590 | 9/1981 | Boute et al. | 370/59 |
| 4,379,950 | 4/1983 | Ahmed | 370/58 |
| 4,429,387 | 1/1984 | Kaminski | 370/58 |
| 4,488,287 | 12/1984 | Carter et al. | 370/58 |
| 4,488,290 | 12/1984 | Dunn et al. | 370/58 |
| 4,564,936 | 1/1986 | Takahashi | 370/58 |
| 4,577,310 | 3/1986 | Korsky et al. | 370/58 |
| 4,597,074 | 6/1986 | Denichelis et al. | 370/58 |
| 4,639,910 | 1/1987 | Toegel et al. | 370/58 |

OTHER PUBLICATIONS

Microelectronic Products Data Book, Issue 1, Mitel Semicodverter; pp. 2-15 through 2-32 MT 8980 Digital Time/Space Crosspoint Switch, Issue 3, Jan. 1985; pp. 2-33 through 2-47 MT 8981.

Digital Time/Space Crosspoint Switch, Issue 2, Jan. 1985.

*Primary Examiner*—M. H. Paschall
*Attorney, Agent, or Firm*—Jones, Askew & Lunsford

[57] ABSTRACT

A space and time switch receives digitized voice and/or data as forty-six separate serial bit streams with each voice or data path occupying one time-slot on one bus, resulting in a total of 1472 paths entering the switch. The switch originates buses and the information in any incoming path can be switched to any outgoing path providing a 1472-by-1472 switching function. The switch includes six basic functional blocks: input, output, speech RAMs, control RAM, controller interface, and state machine. The controller interface receives commands in the form of twenty-four bits appearing as three bytes in three separate operations, stores the bytes until all three are ready, and transfers the command bytes as a combination of address and data bits. The speech RAMs store a complete frame of the data transferred within each time-slot. The control RAM stores commands from the controller interface. The state machine controls operation of the functional blocks and controls readout of the commands from the control RAM, which become addresses for the speech RAMs.

32 Claims, 4 Drawing Sheets

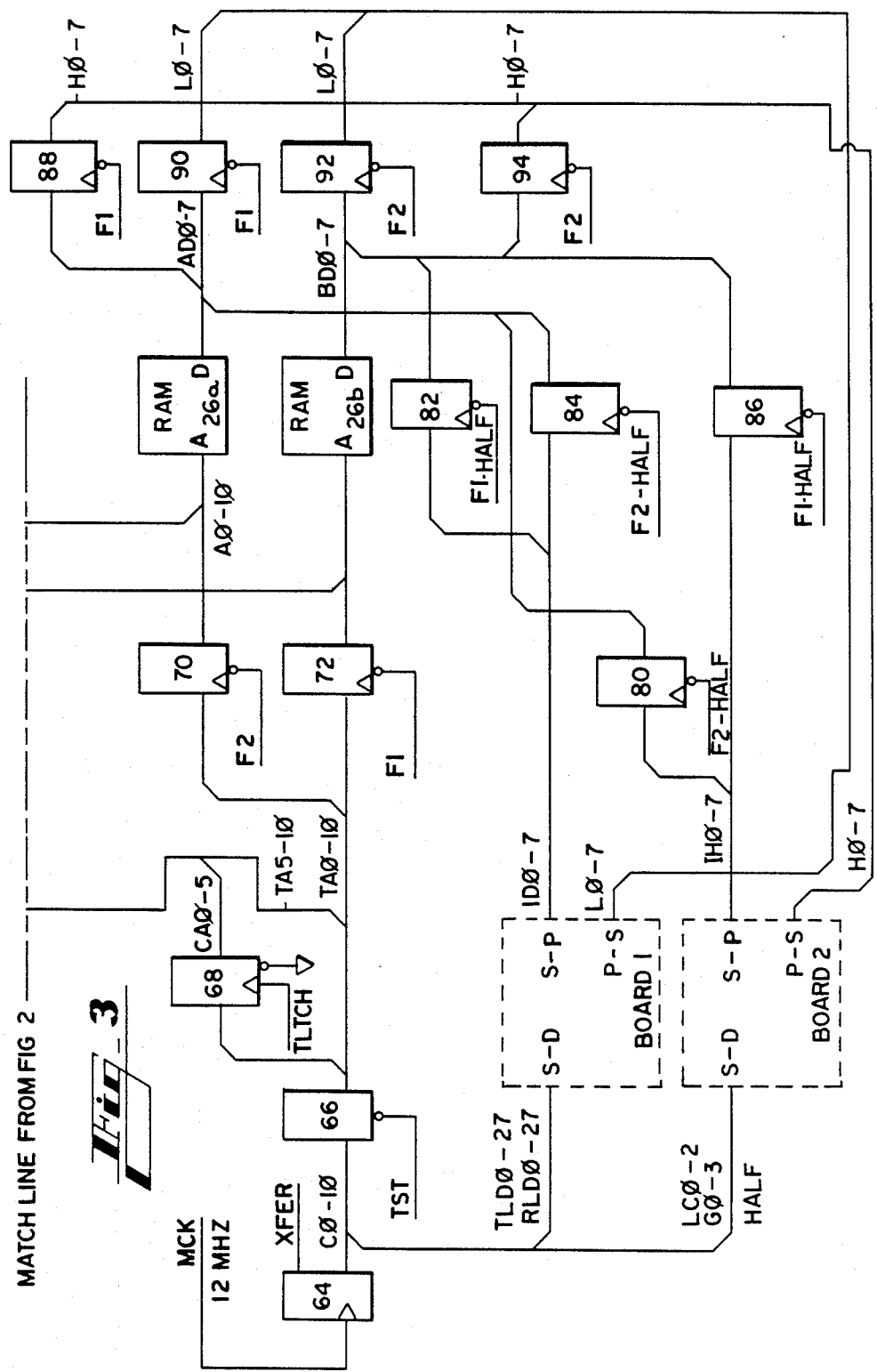

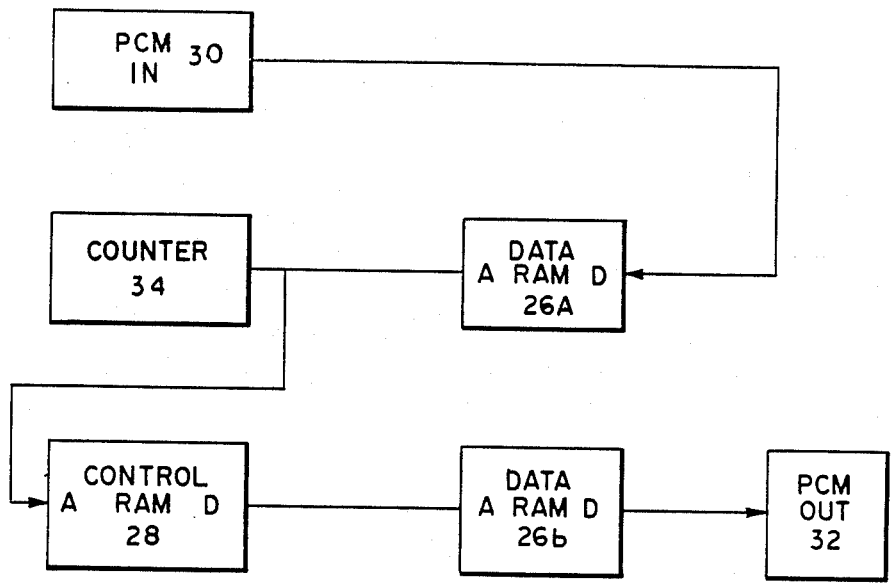
Fig_4a
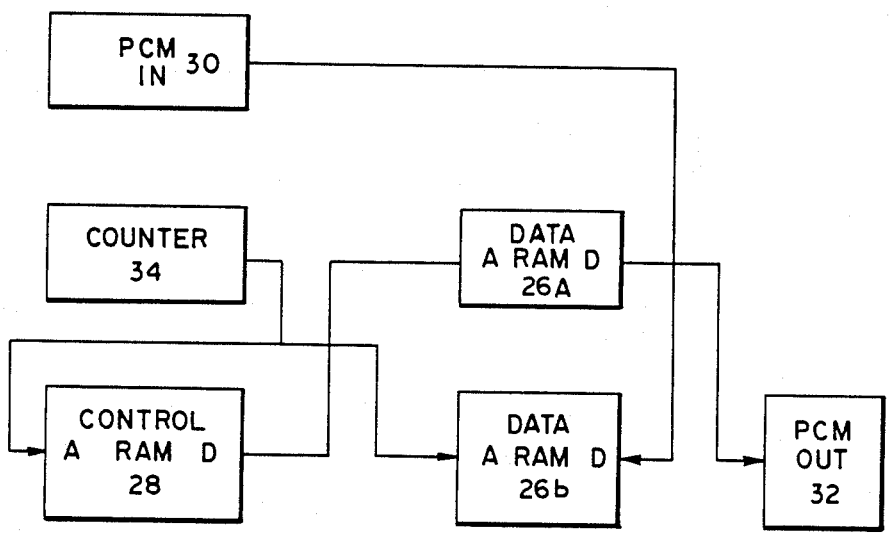
Fig_4b

SPACE AND TIME HAVING MULTIPLEXED MEMORIES

CROSS-REFERENCE TO RELATED APPLICATIONS

The subject matter described in this application is related to the material disclosed in co-filed U.S. patent applications Ser. Nos. 071,979 "PCM RATE CONVERTER"—LuJack Ewell; 072,249 "SPACE AND TIME SWITCH"—Reginald Ratcliff; and 072,254 "CONFERENCE BRIDGE"—Reginald Ratcliff; assigned to the assignee of the present application.

TECHNICAL FIELD

This invention pertains to switching systems and more particularly to a space and time switch for telephone communications systems.

BACKGROUND ART

In many communications systems, such as telephone communications systems for example, a switching function is performed enabling one part to communicate with another party. In fact, a telephone central office is a switching system which switches a caller to a desired called party out of a choice of many other parties. With modern electronic telephone systems, each telephone subscriber can have his own switching system whereby several lines can be connected to the switching system for calls among and between the various lines.

In a digital telephone system it is customary to provide PCM switching functions for the telephone lines. A space and time switch can provide these PCM switching functions for a system. The PCM encoded data for the subscriber terminates at and originates from the space and time switch. It is a space and time switch that facilitates connecting any input to any output. Because the space and time switch is fragile, brittle, and performs many switching functions, it can be expensive employing many large scale integrated circuits or complicated circuitry. Accordingly, it will be understood that it would be highly desirable to provide a space and time switch that uses standard small and medium scale integrated circuits to provide a low power, one or two board space and time switching function module which can be controlled via a simple parallel interface.

SUMMARY OF THE INVENTION

The present invention is directed to overcoming the problems set forth above. Briefly summarized, a space and time switch comprises means for receiving data as a serial bit stream and dividing the stream into a plurality of time-slots. A plurality of buses are formed of a plurality of time-slots. Means are provided for forming data paths with each data path occupying one time-slot on one bus. The space and time switch also includes means for switching a selected incoming time-slot and bus combination to a selected outgoing time-slot and bus combination.

It is an object of the invention to provide a space and time switch for performing PCM switching functions for a switching system using comparatively simple circuitry. It is a feature of the invention that this object is achieved with a space and time switch using standard, small and medium scale integrated circuits arranged on a single board or dual boards providing a low power space and time switching function module. An advantage provided by the switching module is control accomplished via a simple parallel interface.

It is an object of the invention to provide a reliable space and time switch. It is a feature of the invention that this object is achieved by providing multiple test points for diagnostic purposes. An advantage provided by the diagnostic test points is the ability to perform online testing. A test connector can be used to control an onboard state machine and thereby check operability of the space and time switch.

According to one aspect of the invention, a space and time switch for performing PCM switching functions for an electronic telephone comprises means for originating and terminating PCM highways carrying PCM data and first and second RAMs for storing PCM data. During one frame of data the first RAM stores inbound PCM data as outbound PCM data is read from the second RAM, and during the next frame of data the second RAM stores inbound PCM data as outbound data is read from the first RAM. Data read from a third RAM addresses the one of the first and second RAMs providing the outbound data.

Digitized voice and/or data is presented to the switch as forty-six separate serial bit streams. These streams consist of successive frames of thirty-two time-slots each, with frames occurring at an 8 kHz rate. Each voice or data path occupies one time-slot on one bus, resulting in a total of 1472 paths entering the switch. The switch originates forty-six buses and the information in any incoming path can be switched to any outgoing path providing a 1472-by-1472 switching function. This switching function is achieved using standard small and medium scale integrated circuits.

The central memory time switch is made up of two boards, each with its own edge connector, and interconnected to form a single module. One board contains the switch proper, plus the PCM input/output buffers for six highways used in the common equipment shelf, as well as, the sixteen PCM highways and associated clock/SYNC signals. The second board contains the clock, SYNC, and PCM drivers/receivers for the remaining twenty-four highways. Thus, a one board configuration provides a 704-by-704 switching matrix and a two board configuration provides a 1472-by-1472 switching matrix.

Other aspects, objects, features and advantages will become apparent to those skilled in the art upon reading the detailed description in conjunction with the accompanying drawings and appended claims.

BRIEF DESCRIPTION OF THE DRAWINGS

FIG. 3 is a block diagram of a portion of the central memory time switch illustrated in FIG. 1 and is connected to FIG. 2 along the match line.

FIGS. 4a and 4b are is a simplified functional block diagram of the central memory time switch illustrated in FIGS. 1 through 3.

DETAILED DESCRIPTION OF THE PREFERRED EMBODIMENT

Figure 1:
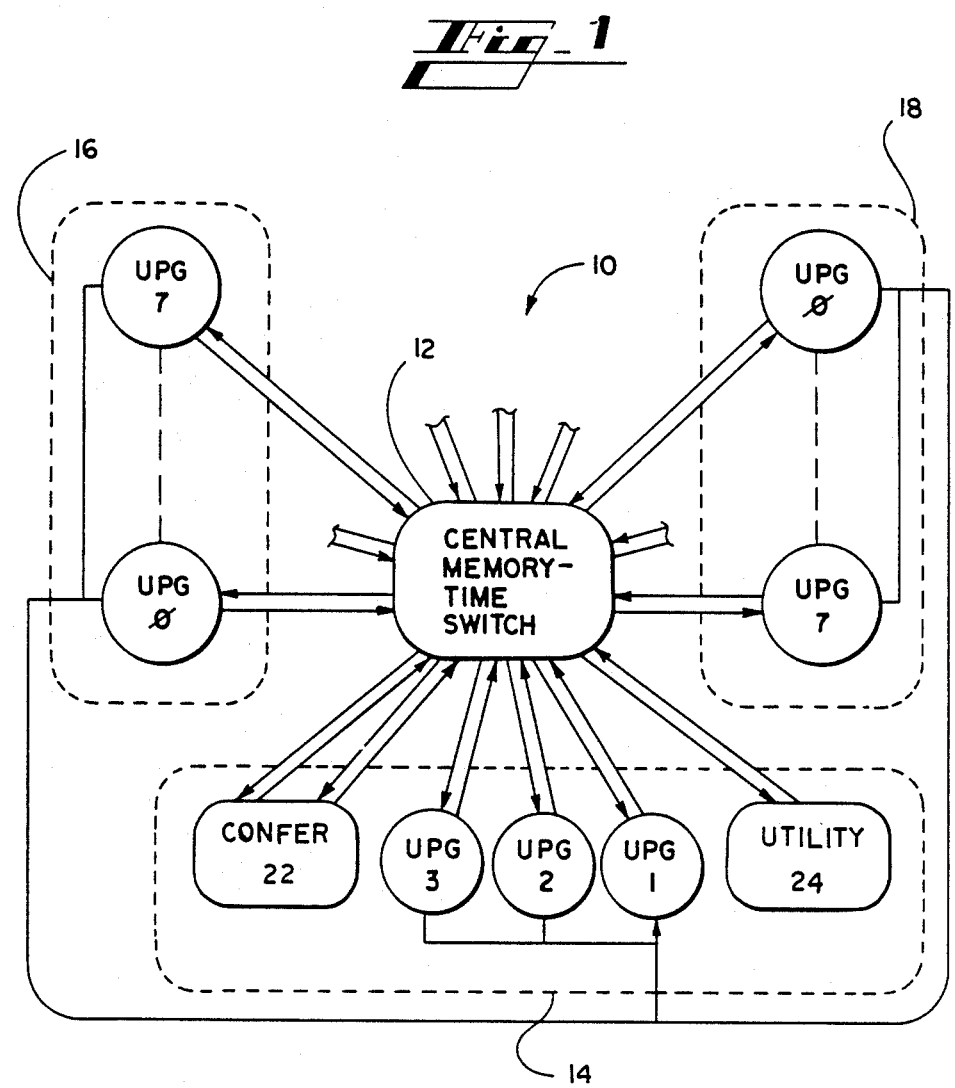
FIG. 1 is a simplified architectural diagram of a preferred embodiment of a digital telephone system incorporating a central memory time switch in accordance with the present invention.

Referring to FIG. 1, a digital electronic telephone system 10, such as the Senior EXEC System for example, manufactured by Solid State Systems, Inc., 1300 Shiloh Road N.W., Kennesaw, Ga. 30144, incorporates a space and time switch in accordance with the present invention. The space and time switch is identified as central memory time switch ("CMTS") 12. The digital electronic telephone system 10 includes a central control computer, a common equipment shelf and universal port shelves. The digital telephone system 10 has two basic configurations: a smaller version with up to 608 ports; and a larger version with up to 1376 ports. The basic building block of the switching structure is a port group consisting of four universal port module slots. Each port group is connected to the CMTS 12 in the common equipment shelf via a full duplex PCM highway supporting thirty-two time-slots. All paths are set up and maintained by the CMTS 12.

Each universal port shelf contains four port groups comprising sixteen module slots as well as a PCM/clock buffer module and two slots for key phone driver or message waiting lamp modules. Odd numbered universal port shelves also contain a microprocessor module. The common equipment shelf contains three port groups, one conference/master clock module, one or two circuit boards comprising the CMTS 12, a microprocessor module, two slots for utility modules, one key phone or message waiting driver, and one arbiter module. The master clock/conference module provides all the system clock signals for the common equipment shelf, clock and SYNC signals to the PCM/clock buffers in the universal port shelves, and system tones to the CMTS 12.

Two different versions of the CMTS module can be used. The smaller CMTS consists of one PC board and provides a non-blocking 704-by-704 switching matrix. The larger CMTS consists of two PC boards and provides a non-blocking 1472-by-1472 matrix. The smaller system is described in greater detail in co-filed application Ser. No. 072,249 which is incorporated herein by reference. Other aspects of a telephone system such as the Senior EXEC System are disclosed in co-filed applications Ser. No. 072,249 and are also incorporated herein by reference.

Still referring to FIG. 1, the basic building block of the control structure is a shelf or shelf pair called a supergroup, such as supergroups 14, 16 and 18. The first supergroup 14 contains the common equipment shelf; this is the minimum Senior Exec System. The additional supergroups 16, 18 consist of pairs of universal port shelves with one of the pair containing a microprocessor module to perform all front end tasks such as scanning and signal distribution. The central control computer issues necessary commands to the various ports and microprocessor. The CMTS 12 may accommodate six supergroups. The common equipment shelf, equipped with an enhanced microprocessor, can support one universal port shelf and operate as a stand alone single supergroup system.

The switching and control architectures are totally independent with the switching architecture being a conventional fixed time-slot/central memory time switch structure. This change results in a significantly lower per port cost. The maximum system size attainable with a single level of central time and space switching is determined solely by the maximum size of the central time space switch. The size of the switch is limited by the semiconductor memory speed and physical packaging constraints due to the large number of I/O pins (4 per PCM highway) required by the Senior Exec system. Based on these considerations, the largest CMTS 12 is a 1472 path device accommodating 46 highways of 32 time-slots each. Allowing 96 ports for system utility functions, the maximum port capacity is 1376 ports. The smaller version of the CMTS 12 supports 22 highway containing a total of 704 time-slots. With 96 ports used for utility functions, the port capacity is 608. The architecture of systems using the small CMTS 12 is upwardly compatible with that of the large CMTS. The following conceptual architectural description is applicable to both versions even though the actual internal implementation may differ. The smaller version is more fully described in application Ser. No. 072,249.

The control architecture of the digital telephone system 10 is a distributed multi-processor scheme with a common central computer communicating directly with peripheral devices such as attendant and administration/maintenance consoles, and special purpose devices such as automatic call distributors. All communication between the central computer and devices located in the common equipment and universal port shelves is accomplished indirectly. The central computer communicates with the shelf microprocessor and the shelf microprocessor communicates with the devices in the shelves.

Each shelf microprocessor module has two external bus structures: the peripheral bus (PB) and the expansion bus (EB). Both the PB and EB extend a portion of the internal microprocessor bus to make the various registers on the other shelf modules appear as memory mapped I/O to the microprocessor. The PB and EB are separately buffered, but otherwise identical. Each consists of eight-bit directional data lines, twelve address lines, a read strobe, and a write strobe. The microprocessor module located in the common equipment shelf communicates with the utility group, CMTS, conference bridge, or key phone or MW driver, and universal port groups via its peripheral bus.

The switching architecture consists of 46 groups each connected to one PCM highway of the CMTS 12. Each PCM highway supports 32 PCM time-slots in each direction; thus, the CMTS 12 is a non-blocking 1472-by-1472 matrix. Two of the groups are combined and contain a 64 port conferencing bridge module 22 which is more fully described in application Ser. Nos. 072,254. A utility group 24 transmits tones to the CMTS 12 and contains DTMF and other tone receivers which receive from the CMTS 12. The remaining 43 groups are universal port groups (UPG) each of which may be equipped with any combination of port modules (lines, trunks, tie lines, digital interface modules, etc.) containing a total of 32 or fewer ports. Thus, up to 1376 ports can be accommodated.

Referring to FIGS. 1 and 4, the 46 PCM highways of the CMTS 12 comprise 1472 input time-slots and 1472 output time-slots. The CMTS 12 consists of a 1472-by-8 dual port speech memory RAM 26, a 1472-by-11 control memory RAM 28, an input multiplexer 30, an output multiplexer 32, a counter 34 and a controller 36. Basically, the input multiplexer 30 converts the 46 PCM serial data streams into a single 1472-by-8 broadside (sample-parallel, time-slot-serial) data stream. In each 125 μs frame, the speech RAM 26 is sequentially loaded with the multiplexed data stream. At the same time the speech RAM 26 output is read out under the control of the contents of the control RAM 28 forming a second 1472-by-8 broadside data stream that is converted by the output multiplexer 32 to 46 PCM serial output data streams. Thus, each output time-slot can be programmed to get its data from any of the 1472 input time-slots permitting broadcasting wherein multiple receivers are connected to a single source without loading the source or permitting cross-talk between listeners.

Addressing of the paths made up of the 46 highways and 32 time-slots per highway is by supergroup, group and time-slot. The first supergroup 14 contains six groups while the other five supergroups contain eight groups each. Each universal port group consists of four module slots. Four such groups are located in each universal port shelf and three are located in the common equipment shelf. Each port in the group is assigned a fixed time-slot for transmission and reception. The time-slot assigned a given port is determined by two parameters: in which slot the module is installed, and the relative port position on the module.

As mentioned, the CMTS 12 contains six basic functional blocks. The PCM input block 30 converts the forty-six incoming serial PCM data streams into forty-six eight-bit parallel streams and multiplexes the parallel streams into one eight-bit stream. This input section also provides a differential to single-ended conversion for the forty highways that are differential. For the first supergroup 14, the one-way delay is a minimum of four time-slots and maximum of thirty-five time-slots. For all other supergroups, the minimum delay is three time-slots and a maximum delay is thirty-four time-slots. For a normal two-party conversation, the maximum CMTS induced delay is two frames. The six buses from the first supergroup 14 are delayed one bit cell to match the other buses.

The PCM output block 32 receives a multiplexed eight-bit parallel data stream from the speech RAM 26, demultiplexes and serializes the parallel stream into forty-six serial streams. The output section 32 also provides differential drivers for the forty differential highways. A one bit delay is added to the first supergroup 14 highways to replace the delay normally provided.

The speech RAM block 26 stores a complete frame of the data transferred within each time-slot, 1472 in all. All data coming from the PCM input 30 is stored in the appropriate location under the control of the counter block 34. All data going to the PCM output 32 originates from the speech RAM 26. The control RAM block 28 stores commands transferred from the common controller through the control interface block 36. These commands are read out under the control of the counter 34 and become addresses for the speech RAM 26.

The counter block 34 determines the actions of the other blocks. During each time-slot, the counter 34 advances through forty-eight states. Forty-six of the states are used to transfer data to and from the PCM input 30 and PCM output 32. These states are approximately 81 nanoseconds each. There are actually two speech RAMs, 26a and 26b that alternate storing and retrieving PCM data. Each of the RAMs, 26a, 26b, stores or retrieves for a full frame then swaps roles. During one frame data is transferred from the PCM input block 30 into the speech RAM 26, while the counter 34 provides the speech RAM 26 address. During the other frame, the counter 34 addresses the control RAM 28 and the value read from there is used to address the speech RAM 26. The value read from the speech RAM 26 is then transferred to the output PCM circuitry 32. The forty-seventh and forty-eighth states are dedicated to the control interface 36.

Commands from the common control unit are transferred to the CMTS 12 via the control interface 36. Each command consists of twenty-four bits transferred as three bytes in three separate operations. The control interface 36 stores these bytes until all three are ready. These bytes are also translated from values convenient to the controller to values compatible with the internal operation of the CMTS 12. When all are ready, the bytes are transferred into the control RAM 28 as a combination of address and data bits.

Referring to FIG. 3, the central memory time switch 12 physically resides on two circuit boards. Circuit board one contains all of the control and switching circuits and a subset of the PCM highway interfaces. Circuit board two contains the remaining PCM highway interfaces. The two boards are preferably connected by a flat cable. The main circuit board, board one, can be used alone to provide a 704-By-704 switching function or in combination with board two to provide a 1472-BY-1472 switching function. Basically, board one contains the CMTS proper, plus the PCM Input/Output buffers for the six highways used in the common equipment shelf which are single ended TTL signals, as well as the sixteen PCM highways and associated clock/sync signals used to connect to the first universal port shelves which are differential, using RS422 type drivers and receivers. The second board contains the clock, sync, and PCM drivers/receivers for the remaining 24 highways connected to the six remaining port shelves. All of the buffers on board two are differential RS-422 types.

Figure 2:
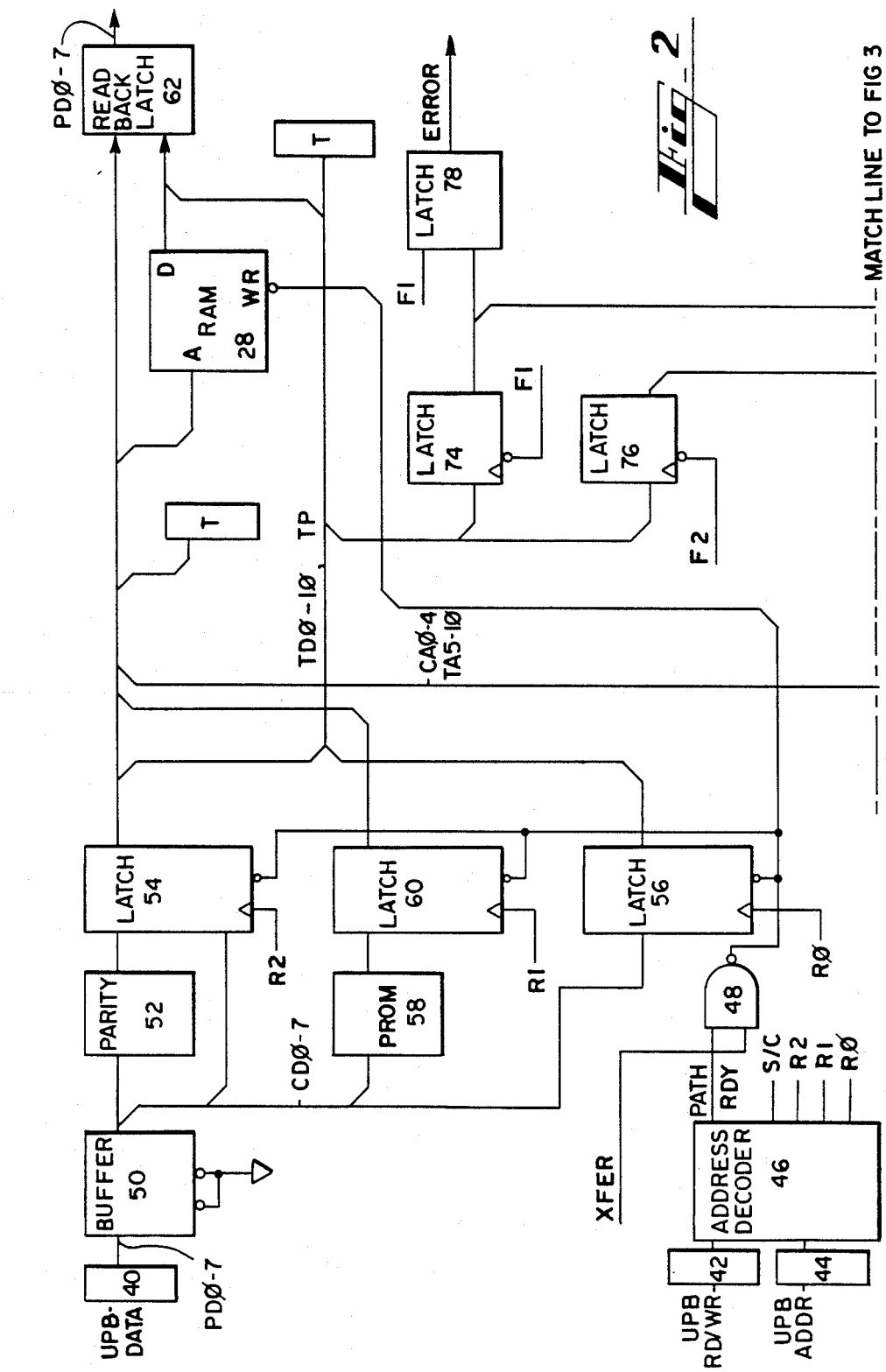
FIG. 2 is a block diagram of a portion of the central memory time switch illustrated in FIG. 1 and is connected to FIG. 3 along the match line.

Referring to FIGS. 2-4, internally the CMTS-12 consists of three RAMs, counters and latches for addressing the RAMs, data flow control gates, and PCM highway interfaces. The switching circuitry of the CMTS-12 includes the two RAMs which store PCM data. The RAMs alternate in function with RAM 26a storing inbound data while the outbound data is read from RAM 26b and during the next frame the rolls are reversed. The third RAM 28 stores the connection matrix. Data is read from the connection matrix and is used to address the PCM RAM that is providing the outbound data. The controller block 36 is the interface for transferring commands from the central control unit to the CMTS-12.

The controller 36 includes data gates 40, 42, and 44. The address gate 44, preferably receives an address signal from the peripheral bus of the digital telephone system and delivers a signal to address decoder 46. The address decoder 46 also receives a read/write command from the peripheral bus through data gate 42 and signals NAND gate 48. Data from the peripheral bus is input to buffer 50 through data gate 40. The output of buffer 50 is input to parity register 52, latches 54 and 56, and PROM 58. The output of the PROM 58 is input to latch 60. The output of parity register 52 is input to latch 54. The output of NAND gate 48 is input to the three latches 54, 56 and 60, and also delivers the write command to RAM 28. The output of latches 54, 56 and 60 are input to read back latches 62 and the address and data terminals of RAM 28. The data terminal for the RAM 28 is also connected to the input of the read back latches 62.

A 12 mHz signal from the clock is received by clock 64 and used by board one and board two. The buffer counter signal is latched by tri-state latch 68 whose output is input to the read back latches 62 and RAM 28 address terminal. The buffer counter signals from buffer 66 is input to RAM 26a through tri-state latch 70 and input to RAM 26b through tri-state latch 72. The data terminal of RAM 28 is connected through latches 74 and 76 to the address terminals of RAMs 26a and 26b. Latch 74 is also connected to parity checker 78.

The parity checker 78 checks for contamination of the received path data stored in the RAM 28. An advantage of the parity checker 78 is the ability of the control unit to detect the presence of parity errors and take corrective action.

The central memory time switch also includes tri-state latches 80, 82, 84, 86, 88, 90, 92, and 94. Latches 82 and 84 are connected to the parallel input bus for PCM data from serial-parallel register located on board one. Latches 80 and 86 are connected to the parallel input bus for PCM data from the serial-parallel registers located on board two. Latches 90 and 92 are connected to the parallel output bus for PCM data to the parallel-serial registers located on board one. Latches 88 and 94 are connected to the parallel output bus for PCM data to the parallel-serial registers on the second board.

The CMTS-12 is controlled through a group of sixteen eight-bit registers accessed via the peripheral control highway. Three of these eight-bit registers are write only, one is read-write, and three are read only. The three write only registers contain the values of the paths to be connected. The read/write register is a module status/control register. The read only registers allow path commands to be read back. The path values contain twelve bits each with the most significant bit being ignored. The path values are loaded into three eight-bit registers with the most significant nybble of the receive and transmit paths sharing one byte. These bytes are held temporarily until all three are loaded then are translated into values compatible with the internal operation of the CMTS and stored in RAM where the outbound path becomes the address and the inbound path becomes the data. In addition, a parity bit is generated and stored. When the data is recalled into an operation, the parity is checked, and if incorrect, a flag bit is set in the status register.

The status/control register provides a means to enable/disable the 46 output highway drivers as a group and detect if any parity errors have occurred. The output highway drivers can be disabled if necessitated by a module failure or other conditions. The parity failure bit is cleared upon a status/control register read. The write portion of the register is cleared upon reset. There is also a parity bit, which if set, will cause the next set of path bytes written to be stored with a parity error which will result in the parity error bit being set. Another bit can be set so that when a transmit path is written, the corresponding receive path will be read form the internal RAM and latched for retrieval. A set of receive and transmit path values comprising a connection can be written to the CMTS as often as every four micro-seconds. While these registers must be loaded in numerical order according to their address no such restrictions reply to the control register.

In the tables below, Table 1 defines the three write only registers, Table 2 defines the status/control register and Table 3 defines the read back registers. In Table 1, each supergroup-group combination defines a highway, both the combination supergroup 0, groups 6 and 7 are invalid. These groups do not exist due to the physical layout of the system.

TABLE 1

| | CMTS Write-Only Registers | | |
|---|---|---|---|
| Address | FF60 | FF61 | FF62 |
| 7 | RS-2 | TS-2 | X |
| 6 | RS-1 | TS-1 | RG-2 |
| 5 | RS-0 | TS-0 | RG-1 |
| 4 | RP-4 | TP-4 | RG-0 |
| 3 | RP-3 | TP-3 | X |
| 2 | RP-2 | TP-2 | TG-2 |
| 1 | RP-1 | TP-1 | TG-1 |
| 0 | RP-0 | TP-0 | RG-0 |

Where:
RP=Incoming (Receive) Path Port/Time Slot (0-31)
RG=Receive Path Group Number (0-5)
RS=Receive Path Super Group Number (0-5)
TP=Outgoing (Transmit) Path Port/Time Slot (0-31)
TG=Transmit Path Group Number (0-7)
TS=Transmit Path Super Group Number (0-5)
X=Don't Care

TABLE 2

| CMTS Status/Control Register | |
|---|---|
| Address | FF68 |
| 7 | PE |
| 6 | S |
| 5 | PR |
| 4 | RB |
| 3 | X |
| 2 | X |
| 1 | X |
| 0 | E |

Where: P1 PE=Parity Error detected if true (read only)
E=Enable Output highway & clock drivers if true (read/write)
X=Don't Care (read/write)
S=Size. 1=1472 port system, 0=704 port system (read/only)
PR=Parity Reverse. If=1, all path commands will cause parity errors (read/write).
RB=Read back. Sets CMTS to path read back mode (read/write).

TABLE 3

| | CMTS Diagnostic Registers | | |
|---|---|---|---|
| Address | FF69 | FF6A | FF6B |
| 7 | RS-2 | TS-2 | DP |
| 6 | RS-1 | TS-1 | RG-2 |
| 5 | RS-0 | TS-0 | RG-1 |
| 4 | RP-4 | TP-4 | RG-0 |
| 3 | RP-3 | TP-3 | 1 |
| 2 | RP-2 | TP-2 | TG-2 |
| 1 | RP-1 | TP-1 | TG-1 |
| 0 | RP-0 | TP-0 | TG-0 |

Where:
RP=Inbound (receive path time slot (0-31)
TP=Outbound (transmit) path time slot (Internal translated value) (0-31)
DP=Even parity bit for RP0-4, RX0-2, and RG0-2
RG=Receive Path Group Number (0-5)

RS=Receive Path Super Group Number (0-5)
TG=Transmit Path Group Number (0-7)
TS=Transmit Path Super Group Number (0-5)

The processes used in interfacing to the central memory time switch includes commanding a new path, initializing the CMTS and reading a connection. In commanding a new path, the address of the talker and listener ports are assembled in the form supergroup, group and port. The port and supergroup talker are written to address :FF60 according to the format illustrated in Table 1. The port and supergroup of the listener are then written to address :FF61, and the group numbers of the talker and the listener are written to :FF62. Once the data is written to :FF62, the microprocessor interface of the CMTS is triggered, the data is transferred to the connection control store, and connection is made. This preferably occurs within about four microseconds.

After a power-up, the connection memory, with its associated parity bits, is filled with random data which will cause parity errors. To clear the parity error bit and LED every location in the connection memory must be filled with valid data. At this time it is also convenient to clear all connections. Both can be accomplished by setting each listener to listen to silence. The non-existent port of highways 6 and 7 of supergroup 0 must also be cleared because the associated memory locations are actually read and checked for parity while the data is ignored. The memory can be cleared by writing a 0 to location :FF60, and then entering a loop which writes all possible values to :FF61 and the bits 4–6 of :FF62. Bits 0–3 of :FF62 are set to 0. Locations :FF60 and :FF61 do not have to be written to unless they change, but :FF62 must be written to for every connection. Once the memory has been cleared location :FF68 must be read to clear the parity error detect bit and LED.

The CMTS allows the shelf microprocessor to retrieve the value of the talker for any arbitrary listener. This is done by setting the RB bit into the control register at :FF68 and writing a partial dummy connection command to :FF61 and :FF62 for the listener and then reading locations :FF69, :FF6A and :FF6B. After the dummy command has been written, the RB control bit should be cleared assuring connection register writes will be interpreted correctly. The data read back will be in the same format as the path command originally written, with the addition of a parity bit in accordance with Table 3. The listener port, time-slot bits will differ from the value written due to the translation performed for internal operations.

Operation of the central memory time switch is best described by reference to FIGS. 2 and 3 and the following chronological account of a connection being made. Referring to FIG. 2, data gate 40 receives input data over the universal peripheral bus and delivers output signal CD0-7 to the buffer 50. The buffer 50 outputs signal CD0-7 which is a buffered version of the universal peripheral bus data. The signal, CD0-7 is input to latches 54 and 56, to parity register 52, and PROM 58. The output of parity register 52 is input to latch 54 and the output of PROM 58 is input to latch 60. Outputs from latches 54 and 56 are output on but TD0-10, TP wherein TP is the parity bit for the TD0-10 bus. TD0-10 is the connection RAM 28 data bus and also drives the address bus A0-10, B0-10 for the PCM RAM 26a, 26b that is currently being read.

A0-10 is the address bus for the PCM data RAM 26a. During F-1 the RAM 26a stores data from the PCM highways and A0-10 carries the time slot and highway counter values. F-1 is the first framing signal. This signal is true every other frame (32 time slots) and signifies the frames where PCM RAM 26a is storing data and the PCM RAM 26b is being read. F2 is the second framing signal. This signal alternates with F1 and designates frames where PCM RAM 26a is read for outgoing PCM data and PCM RAM 26b is storing incoming PCM data. During F2, RAM 26a is read for the data to be put on the PCM highways, and A0-10 carries the talker address from the connection RAM 28. A-11 is a parity bit. B0-10 is the address bus for PCM data RAM 26b. During F-1, RAM 26b is read for the data to be put on the PCM highways, and during F-2, RAM 26b stores data from the PCM highways. RAMS 26a and 26b complement each other.

The data bus for PCM Data RAM 26a is AD0-7 and the data bus for PCM data RAM 26b is BD0-7. Latches 88, 90, 92, and 94 are connected to the buses, AD0-7, BD0-7 and to output buses H0- and L0-7 is the parallel output bus for PCM data to the parallel-serial registers of circuit board two. L0-7 is the parallel output bus for PCM bus data to the parallel-serial registers of circuit board one.

Outputs of latches 80, 82, 84 and 86 are connected to the buses AD0-7 and BD0-7. The input to latches 80, 82, 84 and 86 are signals over buses ID0-7 and IH0-7 as well as signals F1-HALF and F2-HALF. ID0-7 is the parallel input bus for PCM data from the serial-parallel registers on circuit board one, and IH0-7 is the parallel input bus for PCM data from the serial-parallel registers on circuit board two. F1 and F2 are framing signals as mentioned above and HALF designates which half of the circuit board module, board one or board two is being utilized. When low, HALF designates access of the serial-parallel and parallel-serial registers on circuit board one. When high, HALF designates access of the registers on circuit board two. TLD0-27 carries individual selects for the parallel-serial shift registers (one per outbound highway). When true, data is loaded from the L0-7 bus into the appropriate register. On the other hand, RLD0-27 carries individual selects for each of the serial-parallel shift registers and when true gates the received PCM value on to the ID0-7 bus.

In connection with board one and board two, a signal SIZE is pulled to ground when the second board is connected indicating whether 22 or 46 highways can be accommodated. G0-3 is the group decode signals from the highway decode logic that signifies the group of highways being selected. LC0-2 is part of the highway decode signals. LC0-2 binarily encodes which highway's registers from a group is selected.

The counter 64 receives the master clock signal, MCK, preferably at frequency of about 12.288 megahertz. The counter bus C0-10 is the output of the counter 64. On the counter bus C0-5 are the PCM highway counter bits and the C6-10 are the time slot counter bits. The buffer 66 is connected to the counter bus C0-10. The output of the buffer 66 is TA0-10, the address bus for the connection RAMs 26a, 26b and the connection RAM 28. TA0-10 can be driven by the counter 64 or the microprocessor interface. Latch 68 is connected to the bus TA0-10 and receives TLTCH. TLTCH is the latch strobe for capturing TA6-10 so that the time slot address on CA6-10 for the connected RAM is in step with the transmit highways, while TA-6-10 is in step with the receive highways.

The following chronological account of a connection being made will be used to describe the working of the CMTS. The shelf microprocessor receives a connection command from the central processor which it reformats and writes to the command registers of the CMTS 12. The command consists of 22 bits, written to three sequentially addressed 8-bit registers. For each connection, 11 bits identify the talker and the other 11 bits identify the listener. Two commands are required for a two way conversation. After the three registers are loaded, a flag is set in the CMTS microprocessor interface, and the path command is transferred to the connection RAM during the next TLD5 state. When transferred to the RAM, the 11 bits identifying the listener become the address and the 11 bits identifying the talker, plus a parity bit, become the data.

In this example, assume that the listener PCM address is super group 2, group 0, time slot 15, and the talker address is super group 0, group 2, time slot 0. If the addresses are concatenated so that the three bits for super group are the most significant, these address can be represented in HEX format as 20F and 40, or as time slot 15 of highway 10 and time slot 0 of highway 2, respectively. During time slot 0, the data from subscriber 40 is shifted into a shift register in the PCM highway interface section. There is one shift register for each inbound highway. At the end of the time slot, the shift register data is loaded into a parallel register inside the serial-parallel registers by the TLD5-N signal. During the next time slot, the parallel data from each serial-parallel register is transferred in sequence to a holding register by th appropriate RLD signal and then to the PCM RAM that is currently receiving the inbound data. The parallel registers of the serial-parallel integrate circuits are selected by a 48 state counter representing the 46 buses plus two extra states. The 48 state counter also address the PCM RAM, along with a 32 state counter which represents the time slot. Due to the speeds required (81 nanoseconds per state) the address from the counter is also latched so that the address at the RAM is one step behind the counter. The select signals for the serial-parallel registers are offset from the counter so that when the data is actually at the RAM terminals, the correct highway address is at the RAM terminals.

The 48 state counter (C0–C5) runs at a 12.288 megahertz rate. Forty-six of the states represent the 46 highways and the two other states are used to transfer new path commands from the microprocessor interface to the connection RAM. The time slot counter (C6–C10) steps once for each 48 states of the highway counter. A one-bit counter counts frames (32 time slots) and controls which data RAM is being read and which is being written. At the sync pulse, the time slot counter is set to 01 and the highway counter is set to 2B. The time slot counter counts down, and is reset to one since that is the time slot which for which data is currently being read from the serial-parallel registers. The time slot counter is offset by two since the inbound data is delayed by one bit relative to the outgoing data and the sync pulse is keyed on the transmit data timing. The highway counter is set to 2B so that it will have advanced to 6 when the data is ready to be transferred from the serial shift registers to their corresponding parallel registers. This is done at count 6 since there is no highway 6 or 7 due to the architecture of the system and this is the only time that data is not being read from the parallel registers. Count 6 also corresponds to the boundary between time slots.

Since the data for the listener is shifted out during time slot 15 in this example, it must be in the parallel register of the parallel-serial integrated circuit before then. The RAM containing the connection data is also addressed by the time slot and highway counters. The data from this RAM then passes through a latch for addressing the PCM data RAM which is transmitting data. The PCM data to be transmitted is latched for one state before being loaded into the parallel-serial IC. Allowance must be made for two stages of delay between the counts and the parallel-serial IC's and for the difference in the time slot counter and the time slot for which data is to be read. The difference in time slot is handled by the translation PROM 58. The time slot part of the listeners address is translated by the PROM 58 before becoming the address for the connection RAM when the command is stored. The other delays are compensated for by the counter presets and shifting the decodes (TLD and RLD signals) for selecting parallel-serial and serial-parallel IC's. For example, when the latched counter value reads 1, the parallel-serial IC for highway 0 is selected and the counter is one step ahead of the latch.

It will now be appreciated, that there has been presented a central memory time switch for providing all switching functions for a digital telephone system. The CMTS executes a combined time and space switching function. Digitized voice and/or data is presented to the CMTS as forty-six separate serial bit streams. These bit streams are divided into successive frames of thirty-two time-slots, with each frame occurring at an 8 kHz rate. Each time-slot consists of eight bits so that the data streams run at a 2.048 Mbit/s. Each voice or data path occupies one time-slot on one bus so that a total of 1472 paths enter the CMTS. The CMTS also originates forty-six bit streams of thirty-two time-slots. The information in any incoming time-slot-bus combination can be switched to any outgoing time-slot-bus combination under the control of a central processor providing a non-blocking switching function. The CMTS can provide a broadcast function whereby any incoming path can be connected to multiple output paths with absolutely no degradation or crosstalk.

The CMTS is controlled by commands from the digital telephone system microprocessor. To make or change a connection, twenty-four bits are loaded into registers resident and the CMTS. Twelve of the bits describe an incoming bus and time-slot which is to be output on the bus and time-slot described by the remaining twelve bits. Once a connection is set up, it remains in effect until the output path is commanded to receive from a different incoming path. The CMTS is transparent to the data presented to it allowing digitized voice or other analog signals and data to be switched.

The CMTS is constructed in a modular fashion on a single PC board providing a 704-by-704 switching matrix, or on two boards providing a 1472-by-1472 switching matrix. The first circuit board contains the central memory time switch proper, plus single-ended PCM I/O buffers for the six highways used in the common equipment shelf, plus differential (RS 422) I/O buffers for sixteen PCM highways and associated differential clock/SYNC signals which connect to the four universal port shelves. The second board contains the clock, SYNC, and PCM drivers/receivers for the remaining twenty-four highways. A PC board can be equipped with board edge LEDs to provide an immediate visual indication of failure or misapplication, since in normal operation they should all be off. Test connection points allow the state machine to be externally controlled and also allows external observation of some of the buses. Some on line diagnostics can be performed with the aid of the diagnostic registers. While keeping a historical record of parity errors detected and located via the diagnostic registers, failing RAM locations or bits can be detected and noted with alarm messages. The diagnostic circuitry can be exercised by setting the parity reverse bit, commanding a connection, and clearing the parity reverse bit. Within one frame the parity error flag should be set and the translator values for the connection may be read from the diagnostic registers.

While the invention has been described with reference to a preferred embodiment, it will be understood by those skilled in the art that various changes may be made and that equivalents may be substituted for elements thereof without departing from the true spirit and scope of the invention. In addition, many modifications may be made to adapt a particular situation and material to the teaching of the invention without departing from the teachings of the present invention. For example, while the invention has been described in connection with digital telephone system, it is equally applicable to other switching systems, multiplexers, demultiplexers, and other cross-connect systems for digitally represented information.

I claim:

1. A space and time switch for performing PCM switching functions for an electronic telephone; comprising:
   means for originating and terminating PCM highways carrying PCM data;
   first and second RAMs storing PCM data, during one frame of data said first RAM stores inbound PCM data as outbound PCM data is read from said second RAM, and during the next frame of data said second RAM stores inbound PCM data as outbound data is read from said first RAM;
   a third RAM storing a connection matrix, data read from said third RAM addressing the one of said first and second RAMs providing the outbound data;
   means for addressing said first, second and third RAMs; and
   means for controlling data flow.

2. A space and time switch according to claim 1 including
   a forty-eight state counter having forty-six states representing the PCM highways;
   a time-slot counter counting once for each forty-eight states of said state counter; and
   a one bit counter counting thirty-two time-slots and controlling which of said first and second RAMs is being read and written.

3. A space and time switch according to claim 1 further comprising:
   means for receiving data as at least one serial bit stream and dividing said stream into a plurality of time-slots;
   means for originating a plurality of buses with each bus formed of a plurality of time-slots;
   means for forming data paths with each data path occupying one time-slot on one bus; and
   means for switching a selected incoming time-slot and bus combination to a selected outgoing time-slot bus combination.

4. A space and time switch according to claim 3 including means for switching any incoming time-slot and bus combination to any outgoing time-slot and bus combination.

5. A space and time switch according to claim 3 including means for connecting any incoming path to multiple outgoing paths.

6. A space and time switch according to claim 1 wherein said means for originating and terminating PCM highways is transparent to the data presented.

7. A space and time switch according to claim 6 wherein said data is digitized voice.

8. A space and time switch according to claim 6 wherein said data is any digitally represented information.

9. A space and time switch according to claim 1 including means for providing a nonblocking matrix switching function.

10. A space and time switch according to claim 1 wherein said switch resides on two circuit boards with said first circuit board containing said RAMs, control means, addressing means, and a portion of said means for originating and terminating said PCM highways and with said second circuit board containing the remainder of said means for originating and terminating said PCM highways.

11. A space and time switch according to claim 10 wherein said first circuit board alone provides about 495,616 crosspoints.

12. A space and time switch according to claim 10 wherein said first and second circuit boards combined provide about 2,166,784 crosspoints.

13. A space and time switch according to claim 10 wherein said first circuit alone board provides a 704-by-704 switching function.

14. A space and time switch according to claim 10 wherein said first and second circuit boards combined provide a 1472-by-1472 switching function.

15. A space and time switch according to claim 10 including means for detecting the presence of said second circuit board.

16. A space and time switch, comprising:
   input means for converting incoming PCM data streams formed of frames of data into parallel streams and multiplexing said parallel streams into one stream;
   control interface means for receiving command data in the form of bytes and transferring said command bytes as a combination of address and data bits;
   first storage means for storing a complete frame of the data transferred within each time-slot;
   second storage means for storing commands from said control interface means;
   output means for receiving a multiplexed stream from said first storage means and converting said stream to a serial stream; and
   state control means for influencing operation of said input means, control interface means, first storage means, second storage means and output means.

17. A space and time switch according to claim 16 wherein during each time-slot said state control means advances through at least forty-six states which transfer data to and from said input means and output means.

18. A space and time switch according to claim 17 wherein said first storage means is comprised of first and second storage devices alternating storing and retrieving data whereby said first storage device stores data for a full frame while said second storage device retrieves data and during the next frame said first storage device retrieves data while said second storage device stores data.

19. A space and time switch according to claim 18 wherein during said next frame said state control means addresses said second storage means and the value read is used to address said first storage means.

20. A space and time switch according to claim 17 wherein said states are divided into two separate substates and wherein during one substate data is transferred from said input means to said first storage means and said state control means addresses said first storage means.

21. A space and time switch according to claim 20 wherein during the other substate said state control means addresses said second storage means and the value read is used to address said first storage means.

22. A space and time switch according to claim 16 including test interface means for connecting external test equipment for accessing and manipulating internal data streams.

23. A space and time switch according to claim 16 including means, external to said state control means, for controlling said state control means and facilitating static testing and troubleshooting.

24. A space and time switch according to claim 16 including means for providing access points for component or near component level diagnostics.

25. A space and time switch according to claim 16 including means for providing access points for component or near component level diagnostics by external equipment.

26. A space and time switch, comprising:
input means for converting forty-six incoming serial PCM data streams formed of frames of data into forty-six eight-bit parallel streams and multiplexing said forty-six parallel streams into one eight-bit parallel data stream;
control interface means for receiving commands in the form of twenty-four bits appearing as three bytes in three separate operations, storing said bytes until all three bytes are ready and transferring said command bytes as a combination of address and data bits;
a speech RAM storing a complete frame of the data transferred within each time-slot;
a control RAM storing commands from said control interface means;
output means for receiving a multiplexed eight-bit parallel data stream from said first storage means and converting said stream to a serial stream; and
state control means for controlling operation of said input means, control interface means, first storage means, second storage means and output means, said state control means controlling readout of commands from said control RAM, said readout commands becoming addresses for said speech RAM.

27. A space and time switch according to claim 26 wherein said control interface means receives commands in the form of twenty-four bits.

28. A space and time switch according to claim 26 wherein said input means converts forty-six incoming serial PCM data streams to forty-six eight-bit parallel streams and multiplexes said forty-six parallel streams into one eight-bit parallel data stream;

29. A space and time switch according to claim 26 wherein during each time-slot said state control means advances through forty-eight states with forty-six states used to transfer data to and from said input means and output means.

30. A space and time switch according to claim 29 wherein said states are divided into two separate substates of approximately eighty-one nanoseconds each and wherein during one substate data is transferred from said input means to said speech RAM while said state control means addresses said speech RAM.

31. A space and time switch according to claim 29 wherein during the other substate said state control means addresses said control RAM and the value read is used to address said speech RAM.

32. A space and time switch according to claim 26 including a second speech RAM, said first and second speech RAMs alternating storing and retrieving PCM data whereby said first speech RAM stores data for a full frame while said second speech RAM retrieves data and during the next frame said first speech RAM retrieves data while said second speech RAM stores data.

* * * * *